United States Patent [19]

Lines

[11] 4,070,938
[45] Jan. 31, 1978

[54] AUTOMATIC SHEARING DEVICE

[75] Inventor: Lancelot H. Lines, Adelaide, Australia

[73] Assignees: Senil Nominnees Pty. Ltd.; The Commonwealth of Australia; Australian Merino Wool Harvesting Limited, all of Australia

[21] Appl. No.: 709,168

[22] Filed: July 27, 1976

[30] Foreign Application Priority Data

July 29, 1975 Australia .............................. 2548/75
Dec. 19, 1975 Australia .............................. 4351/75
Apr. 1, 1976 Australia .............................. 5452/76

[51] Int. Cl.² ............................................ B26B 19/24
[52] U.S. Cl. ........................................ 83/71; 83/701; 83/928

[58] Field of Search ........................... 83/71, 701, 928; 132/45 R

[56] References Cited

U.S. PATENT DOCUMENTS

| | | | |
|---|---|---|---|
| 3,145,607 | 8/1964 | Geary | 83/701 X |
| 3,241,562 | 3/1966 | Gronier | 83/71 X |
| 3,362,274 | 1/1968 | Thiel | 83/701 X |
| 3,413,985 | 12/1968 | Dlouhy | 83/71 X |

*Primary Examiner*—J. M. Meister
*Attorney, Agent, or Firm*—Kinzer, Plyer, Dorn & McEachran

[57] ABSTRACT

An automatic shearing device including programmed means having in its memory banks information relating to a measured sheep size, and extending the information to control links carrying a cutter, the control controlling the angular position of the links.

7 Claims, 7 Drawing Figures

AUTOMATIC SHEARING DEVICE

This invention relates to an automatic shearing device and, in particular, it relates to a device which can be used to shear sheep in an automatic or semi-automatic manner.

BACKGROUND OF THE INVENTION

It is known to support sheep on special carrier devices in a manner such that the sheep are substantially free of obstruction so that shearing can be effected without moving the sheep.

An example of such a device is that described in Australian Patent Application No. 87705/75 which utilizes a pair of supports which engage the sheep in the areas between the front and the rear legs and supports the sheep in an elevated condition where the sheep is relatively free of any obstructions excepting at the points of contact of the supports.

It has also been proposed to use a device which will render the sheep relatively immobile during the shearing process and it is thus possible to hold a sheep in a position where it could be sheared by an automatic device provided with the necessary sensing means, such a device being disclosed in copending application.

SUMMARY OF THE INVENTION

After extensive research, it has been discovered that shearing can be effected in a relatively simple manner if a set of driven rotatable links supports the shears in a special manner and these links are movable in planes which move the cutters from, for instance, the top of the sheep with a downward and rearward sweep and by making a progressive series of such cuts, and fleece can be removed from the sheep in an entirely automatic operation.

The device which forms the subject of this invention thus comprises a set of mechanical links supported on a base, each having one or more axes about which one or more mechanical links can each rotate relative to the mechanical link or links through which it passes and arranged in such a way that the link or links carrying the one or more shearing heads or shearing devices can be made to follow any desired profile on any part of the body of a sheep and to control the direction of the cutting devices of the shearing heads by driving the various mechanical links with any suitable driving mechanism so as to rotate or oscillate about each other in response to commands from a predetermined stored program of angular positional co-ordinates and/or sensors located in or near the shearing head and the device about to be described is a typical form of the invention but the invention need not of necessity be limited to all of the details hereinafter referred to.

Figure 1:
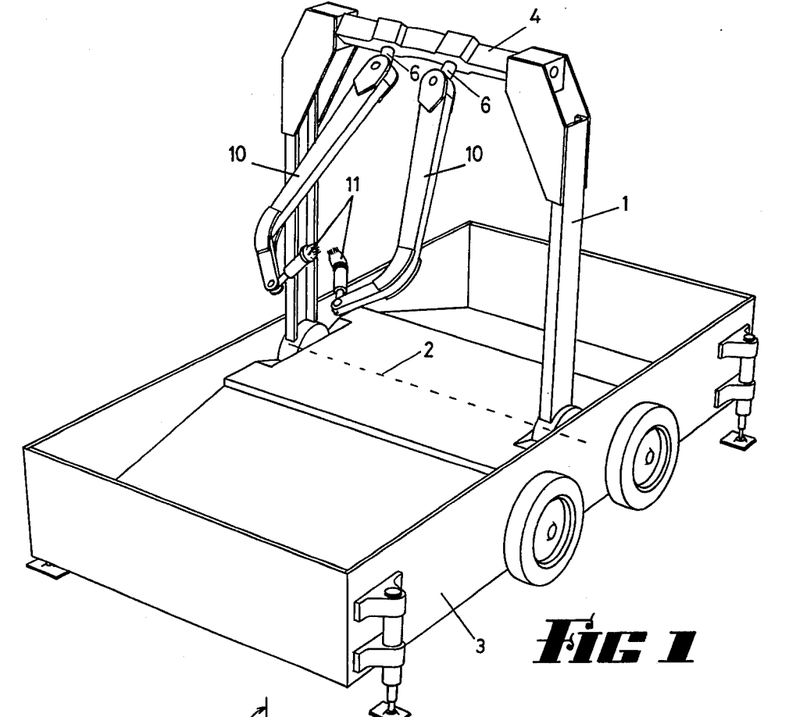
FIG. 1 is a general view of the automatic shearing device.

A frame 1 whose lower end contains an axle 2 which passes through a supporting base 3 in the form of a mobile trailer and about which this frame 1 rotates when driven by any suitable means, carries on its upper end a horizontally positioned beam 4 supported and driven about an axis 5 passing through the upper end of this rotating frame 1.

This horizontally positioned beam supports on it a pair of driven rotatable shafts 6 which are preferably set at a slight angle, the one to the other, to project substantially at right angles to the axis 5 of the horizontally positioned beam 6 so that the axes 7 of these shafts when projected intersect at or near where the median line 8 between these two axes intersects the radial path 9 swept out by the end of the two calliper-like arms 10 which hold the shearing heads 11.

Supported on the driven rotatable shafts 6 are the calliper-like arms 10, each of which are pivoted at one end on a driven axis 12 passing at right angles through the end of each of the abovementioned rotatable shafts 6 so that these arms 10 extend outwards from the horizontally positioned beam 4 but in their outward extension can be driven by the rotatable shafts 6 to give different angular relationships of the arms 10 to the medial plane about which the planes of the calliper arms rotate and which is substantially at right angles to the horizonally positioned beam.

The calliper arms 10 can have their ends moved apart or towards each other by means of any suitable motor or actuator driving the pivoted ends near the horizontally positioned beam about the axis 12. These calliper arms may be driven in unison in opposite angular directions or operated independently.

In this way it will now be realised that each arm 10, not only can be driven arcuately about the axis 5 of the horizontally positioned beam 4, but that also each arm 10 can be rotated about the corresponding shaft 6 through the beam and can be variously angled in relation to the shafts 6 with the use of suitable driving motors or actuators.

At the other end of these arms 10 are brackets 13 which themselves are so supported that they can be orientated about the arms 10 and these brackets 13 support the shearing heads 11 or other shearing devices but in a manner such that these devices can be orientated about the axis 14 of the brackets.

In this way firstly, the angle of each of the shearing heads or other shearing devices can be varied to suit the position of the animal and the shearing heads can also be orientated about their axes so that the combs face in their correct direction during movement of the shearing heads.

The device described thus gives a universal motion to the shearing heads in that they can be rotated to suit the direction of movement at any time, they can be angled on the arms to have a right angle of attack of the comb, they can be moved towards or away from each other by actuating the shafts to move the arms in and out, they can further be positioned by rotating the arms themselves by appropriately actuating the shafts on which they are supported and they can be given an arcuate movement by rotational movement applied to the horizontally positioned beam. This is further illustrated in FIGS. 3 and 4.

The method of achieving the required movements of the various links is by the use of a programmable electronic device which contains in its memory banks the angular co-ordinates of the various links which define each selected position on the surface of a sheep and which controls the motors, actuators or similar mechanisms so that the links move simultaneously to achieve the angular co-ordinates of each position in a time sequence determined by the programmed electronic device and by the use of a sensor or sensors controlling a motor, actuator or similar mechanism to determine the proximity and/or force applied by the shearing head or other shearing device to the surface of the sheep.

The inward and outward radial movement of the calliper arms, together with scaling factors applied to some of the angular co-ordinates of the various links, allows this automatic shearing device to adjust its movement to accommodate various sizes of sheep and the determination of these scaling factors can be achieved by the measurement automatic or otherwise, of some linear dimension of the sheep to be shorn; for example, the length from the nose to rear end of the sheep.

Thus a sensor associates with the shearing head or other shearing device under the control of a programmed electronic device can move over the body of the sheep the initial cutting stroke being from the head along the back to the tail end then following the contour of the body, i.e., from the backbone of the sheep downwards to around the belly and the shearing devices can then be returned to make a second sweep at a new location and this can be continued until the whole of the fleece has been removed, the arcuate movement of the arms having been found to be particularly suitable because of the contour of a sheep when suspended on rests, this allowing the hind legs to be effectively shorn during the downward sweep of the shearing head as the sweep can be made to follow the angle of projection of the rear legs of the sheep.

Because of the rotation of the arms and the universal movement given thereto and because of the possibility of angulating the shearing head or other shearing device on the ends of the arms, it will be realised that an effective shearing mechanism is provided which, under the control of a sensing device and a programmed electronic device, will allow a sheep of any size to be shorn with a minimum of attention.

Figure 3:
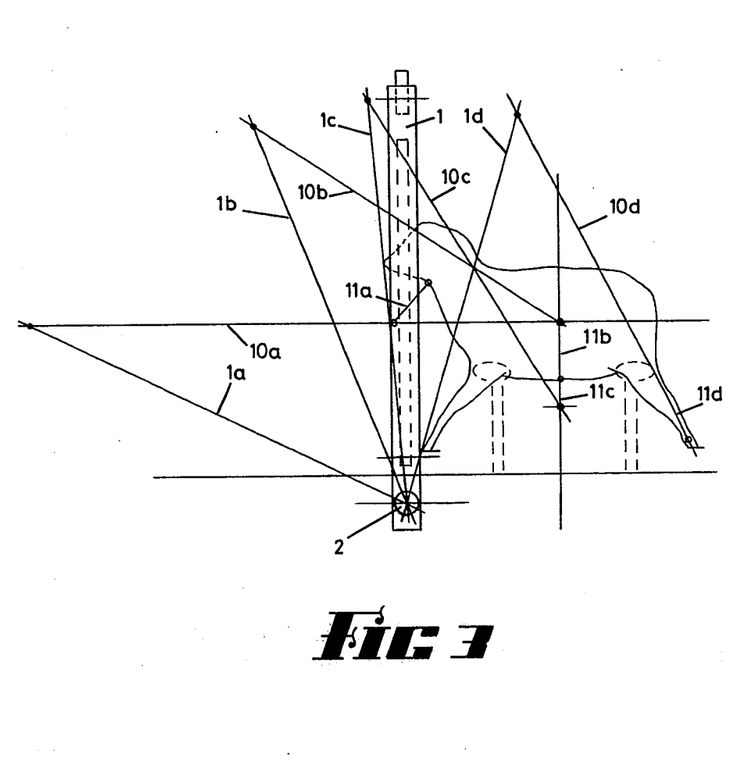
FIG. 3 shows diagrammatically the position of the frame and calliper in shearing a sheep.

Referring to FIG. 3 there is shown a sheep supported in position and immobilized with its muscles in the tetany condition. The sheep being supported by a support having four pads, one engaging just inside each leg.

The frame 1 is shown in its vertical position and also in various portions 1A to 1D, and similarly the calliper arms as shown as 10A to 10D and the shearing heads 11A to 11D to illustrate the various positions of the calliper arms, frame and shearing heads to shear the various portions of the sheep.

Figure 4:
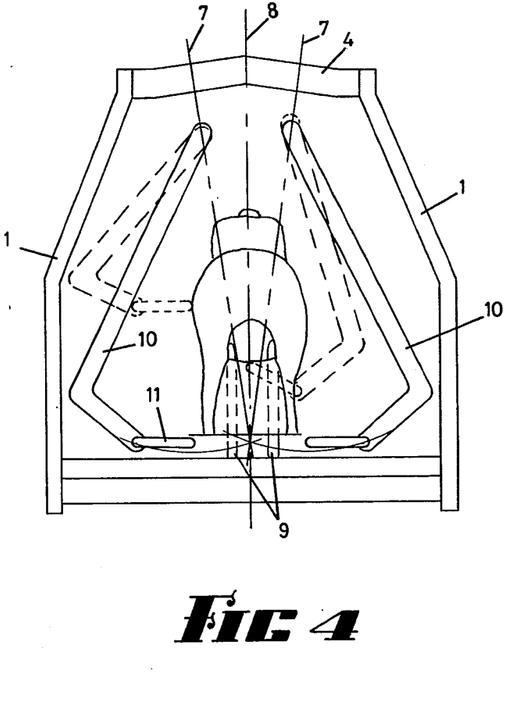
FIG. 4 shows diagrammatically a rear view of the sheep and machine of FIG. 3.

FIG. 4 also shows the positions of the shearing heads and calliper arms for various positions as seen in end elevation.

Figure 2:
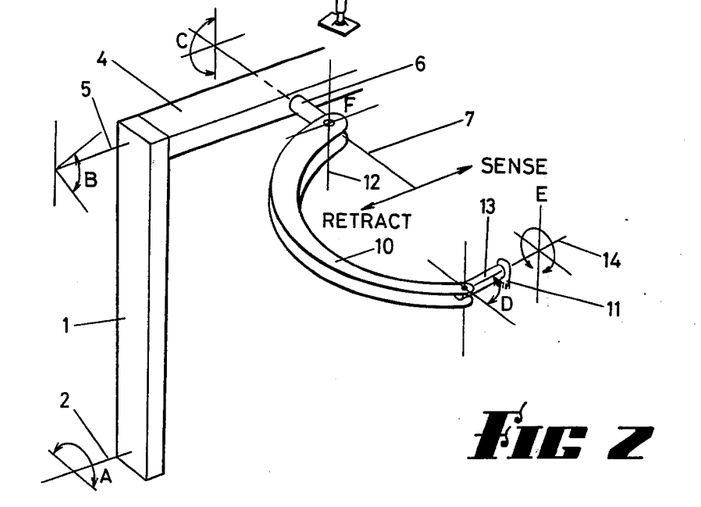
FIG. 2 shows schematically the axis of the machine.

Initially a large number of sheep were measured, and with the sheep immobilized in a state of tetany, any point on the sheep's surface can be defined by angles of the axes A, B, C, D, as shown in FIG. 2, while the angles of the axis E determines the direction of the cutting head and axis F is the in and out motion of the calliper arms.

Figure 5:
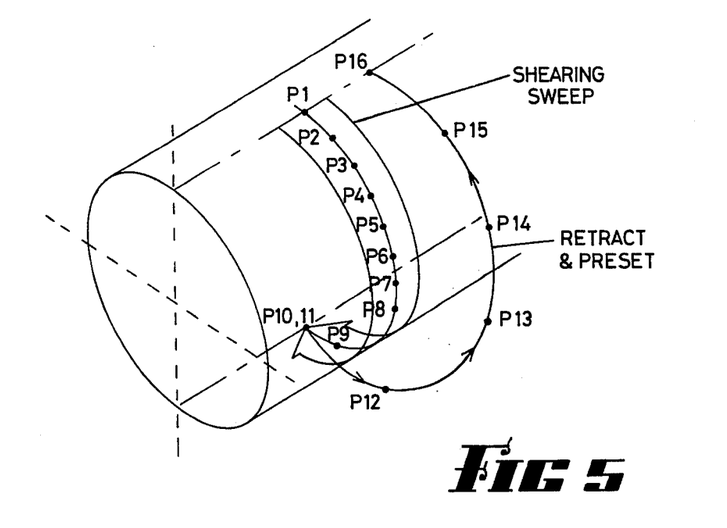
FIG. 5 shows a typical shearing and presetting motion.

The angles of each axis (or co-ordinates) are stored in a memory to define a number of points over the sheep's surface, and are stored in such an order as to describe a series of shearing and presetting motions when sequentially read from memory. Thus FIG. 5 shows diagrammatically the body of a sheep and the various points where the co-ordinates of the angles of each of the axis are measured and stored in memory.

A sensing head is incorporated with each cutter, which sensing head finally controls the cutter to ensure that the cutter follows the contour of the sheep.

For the cutting head to move from one point on the sheep's surface, P1, to the next point, P2, each axis is required to move at a certain velocity, proportional to the angle to be covered by that axis, to ensure that all axes arrive at P2 at the same time.

The following description proposes an analogue method of controlling the velocity of each axis between successive points over the sheep's surface. Since all axes are controlled in a similar manner, only one axis is discussed.

Figure 6:
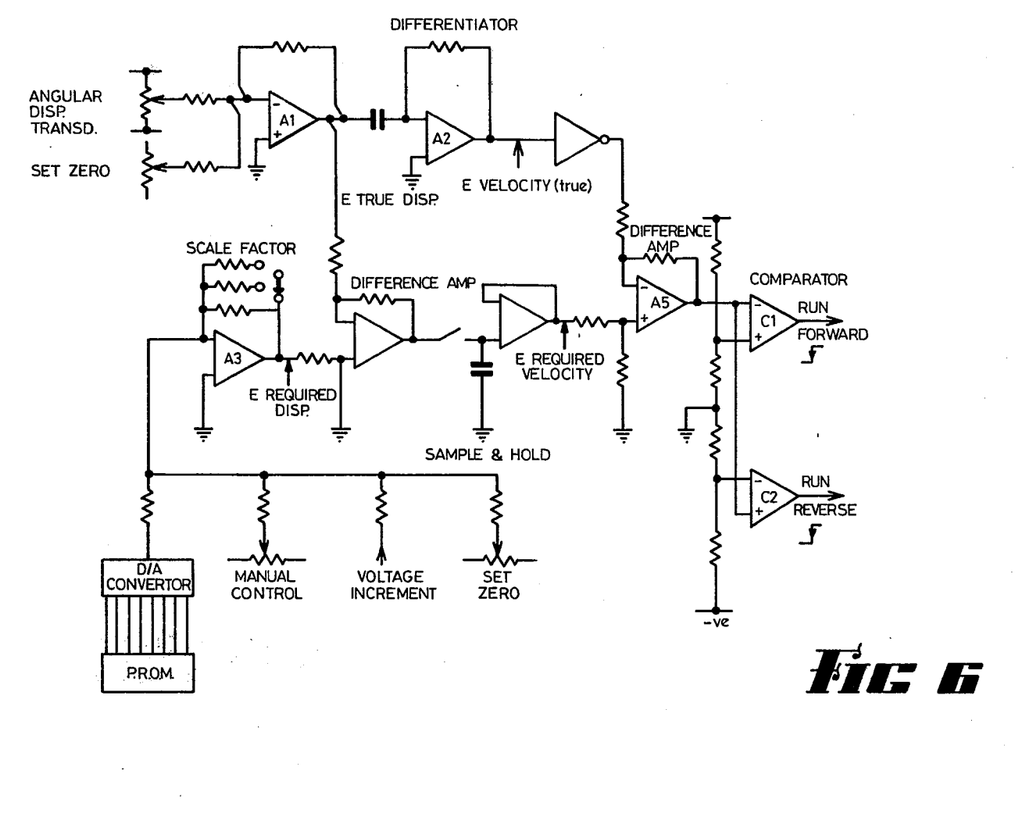
FIG. 6 shows the electronic circuit for control as an example, and FIG. 7 schematically shows an example of the hydraulic control.

Referring to FIG. 6, an annular displacement transducer input to amplifier A1 provides a voltage proportional to the actual position of the axis.

Since the time between successive points is fixed, 0.2 seconds, the velocity an axis has to achieve between point P1, defined as the actual position indicated by the angular displacement transducer, and point P2, the required successive position defined by memory, is proportional to the difference between its actual position P1 and the required position P2. Note that P1 is the actual position of the axis and not necessarily P1 as defined by memory.

An 8-bit word stored in memory, representing the required position of the axis, is converted to a voltage and input to amplifier A3.

The output of A1 (E actual position) and A3 (E desired position) are both input to the difference amplifier A4. Co-ordinates (desired positions) are read from memory every 0.2 seconds. When a desired position is read from memory, the output voltage of A4 is proportional to the velocity that the axis has to achieve to reach that point in 0.2 second.

At time $t1$ the axis is at P1 or angular position $< \phi$ P1. Also at time $t1$, P2 is read from memory. At this time, the output of A1 is proportional to $< \phi$ P1 (actual position), the output of A3 is proportional to $< \phi$ P2 (desired position) and the output of A4, $< \theta$ P2$-\phi$ P1, is proportional to the velocity the axis has to achieve to arrive at P2 at time $t\ 2$.

Immediately a desired position is read from memory, the output voltage of A4 is sampled and held. This voltage (E required velocity) is input to difference amplifier A5. The output of A1 is differentiated by A2 to give the actual velocity and is also input to A5. The output of A5 will go positive if the actual velocity is negative compared to the required velocity and negative if the reverse is true. When the velocities are equal, the output of A5 is zero.

The output of A5 is input to two comparators C1 and C2, arranged such that if the actual velocity is negative compared to the required velocity (output of A5 positive), C1 will provide a run forward signal. If the reverse is true (output of A5 negative), C2 will provide a run reverse signal. If actual and required velocities are equal, both comparators are off and the axis free wheels. The reference inputs of the comparators are set to just above and below zero voltage ($\pm$ 1 bit) to provide a dead spot to prevent the system oscillating.

To stop the axis at the end of a shearing sweep, the last two points of the sweep are given the same co-ordinates so that the velocity is reduced to zero.

If it is required to "hold" the machine part way through the program, the last set of co-ordinates can be continually sampled, thus reducing velocities of all axes to zero.

Changes in lateral dimensions of the sheep are automatically compensated for by the servo controlled calliper arms and surface sensing cutting heads.

For changes in longitudinal dimensions, scaling factors will have to be applied to at least two axes, A and B in FIG. 2. The scaling factors can be applied to the feedback network of A3 to change the gain and thus change the range of the desired angular positions.

The "zero set" pots input to A1 and A3, FIG. 6, adjust the centre about which the scaled axes are required to range.

It may be necessary to change from a velocity feedback system to a position feedback system, e.g., when an axis is under manual control.

This can be accomplished by feeding the output of A4 (FIG. 6) directly into the comparators and disconnecting the output of A5. The comparators then compare the actual position with the required position and correct accordingly, FET switches can effect the change from one system to another.

The machine operates on the principle of a stored profile.

The cutters are steered in the required direction by the combined motion of the axes shown in FIG. 2. The six pre-programmed axes are:
A Main frame
B Beam
C Calliper rotation (each is separately programmed)
D Cutter tilt
E Cutter rotation The retracting (in/out) motion of the cutters and callipers is controlled by a force sensor on the cutters which senses:
  a. The minor variations in sheep contours
  b. Changes in width of the sheep profile
  c. Obstruction to the cutters In cases (a) and (c), the retracting mechanism on the cutter provides a fast response to follow the contour or retract the cutters quickly to prevent injury to the sheep or damage to the cutters. In case (b), the callipers move in or out at a slower rate, following the width of the sheep profile.

The profile of a sheep for programming purposes is viewed as a series of co-ordinates on a simple grid pattern. These co-ordinates or points are stored in the Programmable Read Only Memory (PROM) for each programmable axis to describe a series of desired shearing and pre-setting motions when sequentially read from the PROMs simultaneously for each axis. The shearing action will consist of 48 strokes, each represented by 16 co-ordinate points, each point represented by an 8-bit word in the PROM of each programmable axis.

Attached to each programmed axis is a transducer (potentiometer) which indicates the position of the arm or movement and the velocity at which it is moving at any given time. This information is compared with that provided by the PROM to derive an error signal which is applied to the control element in the drive system of the appropriate axis in pulse form of positive or negative sign as frequently as is required for the controlled axis to establish the correct velocity.

As the various axes approach the end of a stroke, the information fed to each control element will cause the velocity to decrease, reaching zero at the end of the stroke, prior to providing maximum acceleration and velocity for returning the cutter to the start point for the next stroke.

To allow for the variation in sheep size, the information from the PROM after digital to analogue conversion is scaled for some axes in proportion to the size of the sheep to be shorn.

Figure 7:
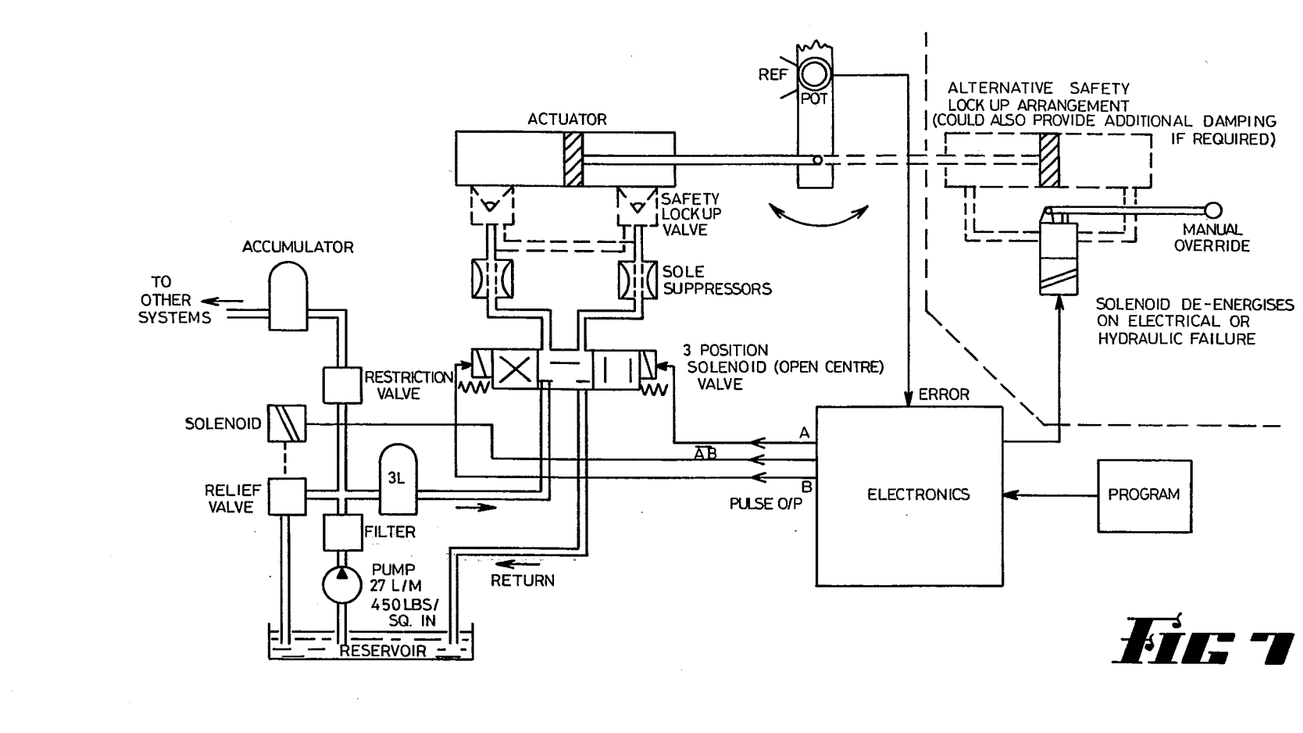

The driven system of the machine is hydraulic with the exception of the cutter drive which is preferably electrical. The configuration of the hydraulic system, showing one axis, the main frame axis, is shown in FIG. 7.

The control element is a three-position quick-acting solenoid-operated hydraulic valve, to which pulses are applied from the Electronic Control Unit causing the valve to actuate and provide pressure across the appropriate actuator in the direction required. When in the neutral position, the input ports of the valve are closed off, but the output ports permit free flow, enabling the actuator and the axis which it is driving to continue in motion. Damping will be required on each axis to ensure stable operation and this is partly obtained by the use of in-line suppressors between the control valve and actuator. Additional damping requirements will be determined during the detailed design of the hydraulic system for the experimental model.

Accumulators are provided between the pump and the main frame axis and the pump and other axes to maintain pressure and provide isolation between the axis during pulsing of the actuators.

A single 2.2 KW pump operating at 450 lb. per square inch supplies all of the hydraulic requirements and a relief valve is used to reduce the load on the pump between peaks in the cutting cycles. Two linear actuators operate the main frames axis and rotary actuators are proposed for the other axes, although linear actuators could also be used. Either a variable or fixed volume hydraulic pump can be used.

The cutting arms which fit on the end of the callipers as a sub-assembly support the electrically-operated cutter, the drive motor being mounted on the cutter arm. A force sensor is included which, when it encounters resistance to forward movement above a certain pressure, operates a spool valve in the assembly. This valve, in turn, operates a linear actuator on the arm and causes the cutter to retract quickly away from the sheep, and, simultaneously, causes the callipers to retract away from the sheep at a slower rate.

In an alternative, distance sensing may be performed by an air jet directed onto the sheep skin via tubes, the variation in air pressure produced by variation of the distance of comb from the skin, is used to move a spool valve to control the position of the actuator.

Furthermore alternate methods of sensing may be employed, such as those employing a high frequency electrical current passing through the skin and body of the sheep, a sensor sensing the field produced. Alternatively a tuned coil can be used, the tuned coil being insulated and becoming detuned when placed in the proximity of an object or surface, and further capacitance sensing can be employed.

This sensing is to accurately control the cutter, the major control being by a computor which has fed into it the angular coordinates which define the selected positions on the surface of a sheep.

The rotation and tilt actions of the arms which position the cutter at the correct angle for shearing are obtained by rotary actuator and pre-programmed axes.

In fact, it is fairly clear that such a device can simply have a sheep positioned in it and the sheep will then be shorn and released when the fleece is removed and an operator will only need to ensure that the sheep are correctly positioned and will not have to effect any of the shearing.

Such a device could, of course, be arranged to effect the main shearing and difficult shearing could be completed by an operator using manual means, but it is anticipated that because of the particular form of the device, it will be possible to completely effect the shearing without manual operation being necessary.

It will be known, of course, that control motors are now available which can readily move the various members in the required manner under control of a programmed device, but similarly it would be possible to use controlled pneumatic or hydraulic actuators for some of the required movements of, for instance, the arms of a rotational movement of the shafts, but it will be realised that the method of moving the various members can be effected in many different ways, the important feature of the invention being the arrangement of a shearing head or shearing device containing a sensor which may or may not be supported on a linear actuator supported on a series of mechanical links in such a manner that the controlled angular rotation of these links relative to each other is sufficient to cause the shearing head or shearing device to follow the contour of any part of the body of a sheep to effect the almost total removal of the fleece without the necessity to use guide rails around the sheep for the mechanical elements to traverse.

While it is preferred to use a pair of arms which operate simultaneously on opposite sides of the sheep, it will be realised that it would be possible to use a device with a single arm and cutter which could completely follow around the sheep.

I claim:

1. A shearing device including means to support an immobilized sheep, a linkage system including a frame pivoted about an axis transverse to the sheep, a beam pivoted to the frame parallel to the transverse axis, and a pair of caliper arms pivoted to the beam by a connection allowing pivoting about two axes at right angles to each other and generally at right angles to the said axis of said beam, cutter means on each caliper, and means to control the movement of the linkage system whereby the cutter means pass over the body to shear the wool therefrom.

2. A shearing device as defined in claim 1, characterised by actuators in the linkage system to move the frame, beam, callipers and cutters about their respective axes, the actuators being under the control of programmed means.

3. A shearing device as defined in claim 2 characterised in that the programmed means is an automatic control based on an average sheep size, the cutter means being further controlled in response to sensing means to sense the relative position of the cutter and the sheep the sensing means forming a signal which actuates an actuator to position the cutter.

4. A shearing devices as defined in claim 2 wherein the programmed means is a programmable electronic device having fed into its memory banks the angular coordinates of the various links which define each selected position on the surface of the sheep, the final position of the cutter being modified by sensing means on the cutter.

5. A shearing device as defined in claim 1 characterized in that the linkage system includes a pair of caliper arms with a cutter mounted on the end of each caliper arm, the control means controlling each caliper arm so that the caliper arms straddle the sheep with each cutter shearing its respective side of the sheep, the cutters operating in unison.

6. A sheep shearing device including means to support an immobilized sheep, cutter means for fleecing the sheep, support means supporting the cutter means for universal movement in and out, fore and aft, up and down and at various co-ordinates in between relative to the body of the sheep so the cutter means can sweep over any part of the fleece on the sheep body, control means to control universal movement of the support means, said control means including programmed means based on an average sheep size, and sensing means adjacent the cutter means to provide a signal to the control means to modify the angular position of the support means relative to said program so that the cutter means follows the contour of each individual sheep to suit the size of the sheep being shorn to the extent it departs from the average sheep size.

7. A shearing device as set forth in claim 6 in which the cutter means includes a pair of shearing heads, and an independent support means for each shearing head.

* * * * *

UNITED STATES PATENT OFFICE
CERTIFICATE OF CORRECTION

Patent No. 4,070,938    Dated January 31, 1978

Inventor(s) Lancelot H. Lines

It is certified that error appears in the above-identified patent and that said Letters Patent are hereby corrected as shown below:

On the Title Page Item [73] should read:

--- Senil Nominees Pty. Ltd. Adelaide, South Australia, Australia, and Merino Wool Harvesting Limited, Perth, Western Australia, Australia .---

Signed and Sealed this

Twelfth Day of September 1978

[SEAL]

Attest:

RUTH C. MASON
Attesting Officer

DONALD W. BANNER
Commissioner of Patents and Trademarks